3,726,827
**RAPID-SETTING NON-ELASTOMERIC POLY-
URETHANE COMPOSITIONS**
Elvis E. Jones, Lake Jackson, Franciszek Olstowski, Freeport, and Donald B. Parrish, Lake Jackson, Tex., assignors to The Dow Chemical Company, Midland, Mich.
No Drawing. Filed Nov. 3, 1971, Ser. No. 195,498
Int. Cl. C08g 22/08, 22/40, 22/42
U.S. Cl. 260—31.8 N          4 Claims

ABSTRACT OF THE DISCLOSURE

Rapid-setting non-elastomeric urethane compositions are prepared from a composition comprising (1) a liquid prepolymer such as one prepared by reacting toluene diisocyanate with the reaction product of about 3 moles of propylene oxide per mole of glycerine,
(2) a liquid polyol containing 3 to 8 hydroxyl groups such as the reaction product of about 3 moles of propylene oxide per mole of glycerine,
(3) as a liquid modifier compound, an ester of a carboxylic acid such as dioctyl phthalate and
(4) a non-amine-containing catalyst such as lead octoate.

---

This invention relates to solid, non-elastomeric, rapid-setting urethane compositions.

Rapid-setting, non-elastomeric urethane compositions have been taught in U.S. 3,378,511. Although the compositions taught therein are useful in many applications, the present invention provides desirable advantages and improvements among which are:

(1) improved physical properties such as one or more of the properties including tensile strength, tensile modulus, flexural yield strength and flexural modulus at the same modifier concentrations, and
(2) permits the use of lower concentrations of modifier.

The present invention concerns a rapid-setting, non-elastomeric, solid, dense, polyurethane composition which comprises (1) an isocyanate terminated liquid reaction product of an organic diisocyanate with polyhydroxyl-containing compound having from about 2 to about 8 hydroxyl groups per molecule and a hydroxyl equivalent weight of less than about 500, said reaction product having from about 20 to about 40 and preferably from about 24 to about 36 percent by weight of free NCO groups,
(2) a liquid polyhydroxyl-containing compound having from 3 to about 8 hydroxyl groups per molecule and an OH equivalent weight between about 75 and about 230,
(3) optionally an liquid ester of a carboxylic acid having a boiling point above about 150° C., and
(4) a non-amine-containing catalyst for urethane formation wherein Components (1) and (2) are present in quantities so as to provide an NCO:OH ratio of from about 0.8:1 to about 1.5:1, Component (3) is present in quantities of from about 0 to less than about 50 and preferably from about 5 to about 40 percent by weight of the sum of Components (1) (2) and (3) and Component (4) is present in quantities of from about 0.01 to about 5 and preferably from about 0.1 to about 2 percent by weight of the sum of Components (1), (2) and (3).

The term "Non-elastomeric" employed herein means a product having a percent elongation of less than about 100%.

Suitable initiator compounds having from 3 to 8 hydroxyl groups which can be employed to prepare the polyether polyols (Component 2) employed in the present invention include, for example, glycerine, trimethylolpropane, pentaerythritol, sorbitol, sucrose, mixtures thereof and the like.

Suitable vicinal epoxy compounds which may be reacted with the initiator compounds to prepare the polyols employed as Component (2) in the present invention include, for example, the lower alkylene oxides and substituted alkylene oxides such as ethylene oxide, 1,2-propylene oxide, 1,2-butylene oxide, 2,3-butylene oxide, epichlorohydrin, epibromohydrin, epiodohydrin, styrene oxide, mixtures thereof and the like.

The prepolymers which may be employed as Component (1) in the present invention may be prepared by the well-known methods such as that described on pages 38 to 43 of Polyurethanes: Chemistry and Technology, Part II. Technology, by Saunders and Frisch, Interscience, 1964.

Suitable polyols which may be employed to prepare the prepolymers, Component (1), are those polyols prepared from initiators having from 3 to 8 hydroxyl groups as mentioned above for Component (2) and those containing two hydroxyl groups per molecule such as ethylene glycol, propylene glycol, butanediol, hexanediol and the like and a vicinal epoxy compound as mentioned above and wherein the polyol has a hydroxyl equivalent weight of less than about 500.

Suitable polyisocyanates which may be employed to prepare the prepolymers, Component (1) in the compositions of the present invention include, for example, any organic diisocyanate having 2 NCO groups per molecule and no other substituents capable of reacting with the hydroxyl groups of the polyoxyalkylene compound. Suitable such polyisocyanates include, for example, 2,4-toluene-diisocyanate, 2,6-toluene-diisocyanate, hexamethylene diisocyanate, p,p'-diphenylmethane-diisocyanate, p-phenylene-diisocyanate, hydrogenated methylene diphenyldiisocyanate (e.g. Hylene®W) naphthalene diisocyanate, dianisidine diisocyanate, mixtures of one or more organic diisocyanates and the like.

Suitable esters of a carboxylic acid which may be employed as Component (3) in the present invention include those esters prepared from mono- and polycarboxylic acids having from about 1 to about 20 carbon atoms such as for example phthalic acid, adipic acid, acetoacetic acid, formic, acetic, abietic, and the like, and wherein the ester portion contains from about 1 to about 20 carbon atoms such as methyl, ethyl, propyl, butyl, hexyl, cyclohexyl, acetyl, decyl, dodecyl, eicoysl and the like so long as the carboxylic acid ester has a boiling point above about 150° C. and is a liquid at room temperature.

These acid esters may be prepared by condensing an acid having from about 1 to about 20 carbon atoms with a saturated or unsaturated aliphatic alcohol having from about 1 to about 20 carbon atoms, with the proviso that the ester product is a liquid and has a boiling point >150° C.

Suitable non-amine-containing catalysts for urethane formation which may be employed as component (4) include, for example, organo-metal compounds of tin, zinc, lead, mercury, cadmium, bismuth, cobalt, manganese, antimony, iron and the like such as, for example, metal salts of a carboxylic acid having from about 2 to about 20 carbon atoms including, for example, stannous octoate, dibutyltin dilaurate, dibutyltin diacetate, ferric acetylacetonate, lead octoate, lead oleate, phenylmercuric propionate, cobalt naphthenate, lead naphthenate, mixtures thereof and the like.

It is preferred that the catalysts be employed in liquid form. Those catalysts which are not ordinarily liquids may be added as a solution in a solvent which is compatible with the other components employed in the composition of the present invention. Suitable such solvents include, for example, dioctylphthalate, polyoxyalkylene glycols, mineral spirits, dipropylene glycol, mixtures thereof and the like.

The rigid polyurethane products of the present invention can be prepared by rapidly mixing the components of the compositions of the present invention. It is preferred to thoroughly blend together the components represented by (1) the isocyanate-containing prepolymer, (2) the polyol, and (3) the liquid modifier compound and then mixing the resultant mixture with component (4) the catalyst. Mechanical dispensing or combination mixing-dispensing devices can be employed by utilizing 2 or more streams of the individual components or mixtures of the components which are introduced into said device.

Other components including inert fillers such as, for example, sand, microballoons, glass fibers, asbestos, aluminum granules, silicon carbide powder and the like, coloring agents, such as pigments and dyes including, for example, chromic oxide, ferric oxide, mixtures thereof and the like may be employed in the compositions of the present invention without detracting from the scope thereof.

The compositions of the present invention rapidly produce solid products which may be demolded, i.e. the articles produced therefrom may be removed from the mold, within about 5 minutes, usually within about 3 minutes and preferably within about 1 minute or less from the time the catalyst is blended into the mixture and do not require the application of external sources of heat to accomplish this, although in some circumstances it may be desirable to post cure, at elevated temperatures, the products in order to develop certain properties. The compositions of the present invention not only can be demolded within 5 minutes and often in less than 2 to 3 minutes, but the cast objects produced therefrom have developed sufficient strength properties to be employed immediately upon cooling to room temperature for their intended purpose. The cast objects are hot or warm to the touch immediately after removing from the mold due to the exotherm generated during the reaction. This is a valuable contribution to the urethane molding art, in that productivity can be increased employing a given quantity of molds.

The choice of the catalyst involves the desired time delay between the catalyst being mixed into the reagents and the liquid mix "instantly" solidifying. For example, if a prepolymer prepared from tolylene diisocyanate and a polyol that is the reaction product of glycerine with propylene oxide and having a molecular weight of about 260 is employed with a polyol prepared from propylene oxide and glycerine having a molecular weight of about 260, then the addition of about 1% stannous octoate catalyst will yield a delay or induction time of about 10 seconds before the mixture suddenly "freezes" into a solid. Substitution of dibutyltin dilaurate at the same catalyst level stretches this delay time to about 20 seconds, and phenyl mercuric propionate exhibits a delay time of about 120 seconds before extremely rapid solidification occurs.

The change of isocyanate employed in the prepolymer preparation to a less reactive one, i.e. the substitution of hexamethylene diisocyanate for tolylene diisocyanate, correspondingly increases the delay time before rapid solidification takes place.

The delay time of the reaction mixture can also be altered by changes in the quantity of the organo-metallic catalyst. However, when the smaller amounts of catalyst are employed it is preferred that they be diluted with a suitably compatible solvent including petroleum solvents such as, for example Varsol®, halogenated aromatic compounds such as for example, trichlorobenzene, liquid alkylene carbonates such as, for example, propylene carbonate, mixtures thereof and the like.

Suitable materials from which adequate molds, for casting the compositions of the present invention, may be prepared include polymers such as, for example, polyethylene, polypropylene, their copolymers and the like, polyurethanes, polysiloxane elastomers, Mylar®, cured polyepoxides, mixtures thereof and the like.

It is preferred to employ relatively thin wall molds or molds having a low heat capacity or thermal conductivity. Heavy molds made of relatively high thermal conductivity materials such as aluminum, copper, iron or steel and the like may present curing problems, i.e. the reactants may not be readily demolded unless the mold is preheated to about 50–90° C., especially when casting relatively thin sections. However, high thermal conductivity materials such as copper or aluminum can be employed as thin wall molds without preheating if the thermal capacity of the mold is relatively low compared to the amount of heat liberated in the casting.

The compositions of the present invention are useful as, but not restricted to such uses as, a casting material for preparing bearing surfaces, annular spacers, decorative objects, furniture or furniture components, gears or other machine components, threaded protective plugs and caps, and the like.

The following examples are illustrative of the present invention but are not to be construed as to limiting the scope thereof in any manner.

DESCRIPTION OF COMPONENTS EMPLOYED IN THE EXAMPLES

Polyol A was the reaction product of about 3 moles of propylene oxide with 1 mole of glycerine and having a molecular weight of about 260 and an OH equivalent weight of about 87.

Polyol B was the reaction product of about 3 moles of ethylene oxide per mole of glycerine having a hydroxyl equivalent weight of about 76.

Polyol C was the reaction product of about 5 moles of propylene oxide per mole of pentaerythritol and having a hydroxyl equivalent weight of about 95.

Polyol D was the reaction product of propylene oxide with sucrose having an OH equivalent weight of about 160.

Polyol E was the reaction product of propylene oxide with glycerine to a hydroxyl equivalent weight of about 150.

Polyol F was the reaction product of propylene oxide with a mixture of sucrose and glycerine in a weight ratio of sucrose:glycerine of about 2:1 and having a percent OH of about 15 percent.

Prepolymer A was the reaction product of Polyol A with toluene diisocyanate (80/20 mixture of 2,4-/2,6-isomers) having a percent free NCO of 32 weight percent.

Prepolymer B was the reaction product of toluene diisocyanate with Polyol C and containing about 31.3% free NCO groups.

Prepolymer C was the reaction product of toluene diisocyanate with Polyol F and having about 30.4% free NCO groups.

Prepolymer D was the reaction product of Polyol A and xylylene diisocyanate and had 31.5 wt. percent free NCO groups.

T–9 Catalyst is a commercial tin-carboxylate commercially available from M & T Chemical having the following properties:

specific gravity at 25° C.—1.25 to 1.27
percent tin, total—28–29%
percent stannous of total tin—96.0% min.
viscosity at 25° C.—360 cs. max.

Example 1

In a production assembly containing appropriate holding tanks connected to metering pumps and coupled to a fluid mixing and dispensing device (Pyles mixing head, Supershot Model No. 91031) capable of delivering 15 lbs. per minute of liquid reactants, a series of rigid dense polyurethane test panels having a thickness of ¼" and weighing about 5 lbs. each were prepared by metering two reactant streams to the mixing device. These castings were molded in a magnesium metal mold with quick closure fittings. The metering pumps were arranged to feed a stoichiometric ratio of NCO to OH to the mixing head.

(A) Example of the present invention.—The following composition was employed in the above described procedure.

| Stream 1 | | Stream 2 | |
|---|---|---|---|
| Component | Parts by wt. | Component | |
| Prepolymer A | 54.5 | Polyol A | 0.685 part by wt. per part of Prepolymer A. |
| Dioctyl phthalate (DOP) | 45.5 | T-9 catalyst | 1% by wt. of prepolymer, polyol and dioctylphthalate. |

The dense rigid polyurethane panels were found to exhibit excellent surface reproduction; no sign of incompatibility problems, no evidence of DOP "bleeding" or exudation and homogeneity over a series of castings was excellent. The physical properties are given in Table I.

(B) Example of the prior art.—The following composition was employed in the procedure described in (A) above.

| Stream 1 | | Stream 2 | |
|---|---|---|---|
| Component | Parts by wt. | Component | Parts by wt. |
| Toluene diisocyanate, 80/20 mixture of 2,4-/2,6-isomers | 33 | Polyol A | 33 |
| DOP | 33 | T-9 | 1 |

The cast rigid, dense, polyurethane panels produced by the above process and reactants were found to exhibit evidence of poor compatibility of the formulation components and the product panels were characterized as having extremely poor surface quality, striations due to non-homogeneity and regions of dioctyl phthalate "bleeding" or exudations. The physical properties are given in Table I.

TABLE I

| Physical property | ASTM test method | B (prior art) | A (present invention) |
|---|---|---|---|
| Tensile strength, p.s.i. | D-638-68 | 5,315 | 7,900 |
| Percent elongation | D-638-68 | 22.8 | 17 |
| Tensile modulus, X10⁵ p.s.i. | D-638-58 | 1.11 | 1.42 |
| Flexural Yield, p.s.i. | D-790-66 | 9,300 | 11,300 |
| Izod impact strength, 73° F. | D-256-56 | (¹) | 1.05 |

¹ Not tested.

Example 2

(A) Present invention.—Employing the apparatus and procedure of Example 1A, the following components were employed.

| Stream 1 | | Stream 2 | |
|---|---|---|---|
| Component | Wt. percent | Component | Wt. percent |
| Prepolymer A | 51 | Polyol A | 35 |
| DOP | 13 | T-9 | 1 |

A dense, rigid, translucent casting free of bubbles was obtained which had a density of 1.16 g./cc. The physical properties are given in Table II.

TABLE II

| Physical properties | ASTM test method | A |
|---|---|---|
| Tensile strength, p.s.i. | D-638-68 | 13,600 |
| Percent elongation | D-638-68 | 9 |
| Tensile modulus, X10⁵, p.s.i. | D-638-58 | 2.59 |
| Flexural modulus, X10⁵, p.s.i. | D-790-66 | 3.95 |
| Flexural yield, p.s.i., X10³ | D-790-66 | 16.1 |
| Izod impact strength, 73° F. | D-256-56 | 0.52 |
| Izod impact strength, −50° F. | D-256-56 | 0.48 |
| Compressive yield, p.s.i. | D-695-58 | 13,200 |
| Compressive modulus, X10⁵, p.s.i. | D-695-58 | 1.99 |
| Heat distortion, ° F., 264 p.s.i. | D-648-56 | 196 |

(B) Prior art.—Same procedure and apparatus as in Example 1A employing the following components.

| Stream 1 | | Stream 2 | |
|---|---|---|---|
| Component | Wt. percent | Component | Wt. percent |
| Toluene diisocyanate 80/20 mixture of 2,4-/2,6-isomer. | 43 | Polyol A | 43 |
| DOP | 13 | T-9 | 1 |

This blend was found to "instantly" solidify in less than 30 seconds after mixing and the opaque white casting was demolded in less than 30 seconds after solidification occurred. However, over the next 2 to 4 minute interval, this casting swelled and developed fissures and resulted in a misshaped casting having a density of 0.564 g./cc.

Example 3

(A) Present invention.—The following components were thoroughly mixed, the catalyst being added last, and cast into a Mylar® tray.

50 grams of Polyol A
73 grams of Prepolymer A
12 grams of DOP
1 gram of T-9

The mixture suddenly solidified within about 20 seconds after catalyst addition. The resultant transparent, rigid, bubble-free casting was cut into 2" x ½" x approximately ¼" strips.

(B) Prior art.—Same procedure as in A above employing the following components.

33 grams of Polyol A
33 grams of toluene diisocyanate
33 grams of DOP
1 gram of T-9

The mixture suddenly solidified within 15 seconds after catalyst addition into a solid, white, opaque sheet which was cut into 2" x ½" x approximately ¼" strips.

A strip of each of the castings from A and B above were placed into bottles containing methylene chloride, tetrahydrofuran, acetone and ethyl acetate.

After 1½ hours of contact with methylene chloride, tetrahydorfuran and acetone, the strips from composition B (the prior art) exhibited catastrophic shredding whereas the strips from composition A (exemplary of the present invention) appeared to be unaffected in acetone and tetrahydrofuran and only slight swelling in methylene chloride. Both compositions appeared to be unaffected by the ethyl acetate after 1½ hours of contact, but after 20 hours, composition B began to shred into slivers whereas composition A appeared to be unaffected.

Example 4

(A) Present invention.—Employing the procedure of Example 3, a casting was prepared from the following composition.

73 grams of prepolymer A
44 grams of polyol B
30 grams of dimethyl phthalate (DMP)
0.2 cc. of lead naphthanate (24% Pb)

The mixture suddenly solidified within about 15 seconds after catalyst addition and had a density of 1 gram/cc. an a Shore D hardness of about 96.

(B) Prior art.—A casting was prepared from the following composition employing the procedure of A above.

50 grams of toluene diisocyanate
44 grams of Polyol B
30 grams of DMP
0.2 cc. of lead naphthenate (24% Pb)

After this mixture was cast in a Mylar® tray, it solidified in about 15 seconds after catalyst addition and then expanded into a bubble filled solid having an apparent density of 0.48 gram/cc.

Example 5

Employing the procedure of Example 3A, the following composition was employed.

50 grams of Polyol A
73 grams of Prepolymer B
10 grams of diallylphthalate
0.1 cc. of lead octoate Within about 50 seconds after catalyst addition, the mixture suddenly solidified into a transparent, rigid sheet having a density >1 gram/cc. and a Shore D hardness of 96.

Example 6

Employing the procedure of Example 3A, the following composition was employed.

90 grams of Polyol D
70 grams of Prepolymer A
40 grams of DOP
0.4 cc. of lead octoate The mixture suddenly solidified within about 45 seconds after catalyst addition and was demolded within about 60 seconds after catalyst addition. The resultant transparent, rigid sheet had a density of >1 gram/cc. and a Shore D hardness of about 95.

Example 7

Employing the procedure of Example 3A, the following composition was employed.

86 grams of Polyol E
73 grams of Prepolymer B
30 grams of dimethyl adipate
0.1 cc. of lead naphthenate Within about 20 seconds after catalyst addition, the mixture suddenly solidified into a transparent, rigid sheet having a density >1 gram/cc. and a Shore D hardness of 84/44 (30 seconds).

Example 8

Employing the procedure of Example 3A the following composition was employed.

50 grams of Polyol A
70 grams of Prepolymer C
40 grams of DOP
0.4 cc. of lead octoate The mixture instantly solidified within about 50 seconds after catalyst addition and was demolded within about 70 seconds after catalyst addition. The opaque, rigid sheet had a density >1 gram/cc. and a Shore D hardness of about 95.

Example 9

Employing the procedure of Example 3A, the following composition was employed.

50 grams of Polyol A
73 grams of Prepolymer D
30 grams of DOP
1 cc. of lead octoate Within about 40 seconds after catalyst addition the mixture suddenly and simultaneously solidified and turned into a white, opaque solid. After about 60 seconds from catalyst addition, the bubble free product was removed from the tray and was found to have a density >1 gram/cc. and a Shore D hardness of 95.

Example 10

Employing the procedure of Example 3A, the following composition was employed.

50 grams of Polyol A
73 grams of Prepolymer A
30 grams of ethyl aceto acetate ($CH_3-\overset{O}{\underset{\|}{C}}-CH_2-\overset{O}{\underset{\|}{C}}-O-C_2H_5$)
1 cc. of lead octoate The mixture instantly solidified within about 20 seconds after catalyst addition and was demolded within about 35 seconds after catalyst addition. The resultant product was a hard, rigid, translucent sheet having a density of >1 gram/cc. and a Shore D hardness of 64/34 (30 seconds).

Example 11

Employing the procedure of Example 3A, the following composition was employed.

50 grams of Polyol A
73 grams of Prepolymer A
30 grams of methyl abletate ($C_{19}H_{29}\overset{O}{\underset{\|}{C}}-OCH_3$)
1 cc. of lead octoate The mixture suddenly solidified within about 35 seconds after catalyst addition and was demolded within about 55 seconds after catalyst addition. The product was a hard, rigid translucent sheet having a density >1 gram/cc. and a Shore D hardness of 98.

Example 12 (Comparative)

The following example demonstrates that an amine catalyst does not produce products which can be demolded within 5 minutes after catalyst addition which can be utilized without further curing.

Employing the procedure of Example 3A the following composition was employed.

50 grams of Polyol A
73 grams of Prepolymer A
50 grams of DOP
1.7 cc. of triethylene diamine as a 33% solution in dipropylene glycol.

The mixture started turning opaque within about 60 seconds after catalyst addition and a gradual thickening occurred over the next several minutes. The casting could not be removed from the Mylar® mold in less than 6 minutes (product was still a tacky polymer). On separating the partially cured casting from the mold, the polymer product was found to be relatively brittle and weak.

Example 13

(A) Present invention.—Same procedure as in Example 3A employing the following components.

50 grams of Polyol A
75 grams of Prepolymer A
1 cc. of lead octoate (24% Pb)

The mixture suddenly solidified within about 10 seconds after catalyst addition and was removed from the mold within about 40 seconds after catalyst addition. The non-elastomeric casting had a density of 1.14 grams/cc.

(B) Comparative experiment.—Same procedure as in Example 3A employing the following components.

50 grams of Polyol A
50 grams of toluene diisocyanate (80/20 mixture of 2,4-/2,6-isomers)
1 cc. of lead octoate (24% Pb)

The mixture suddenly solidified within about 10 seconds after catalyst addition and within about 2 to 3 minutes after catalyst adition, the casting developed fissures, swelled and distorted. The casting had a density of 0.448 gram/cc.

Example 14

(A) Present invention.—Same procedure as in Example 3A employing the following components.

55 grams of Polyol C
75 grams of a prepolymer prepared from Polyol C and toluene diisocyanate and having 31.8% free NCO.
1 cc. of lead octoate The mixture suddenly solidified within about 10 seconds after catalyst addition and was removed from the mold within about 40 seconds after catalyst addition. The dense, rigid casting was free of cracks and splits and had a density greater than 1 gram/cc.

(B) Comparative experiment.—Same procedure as in Example 3A employing the following components.

55 grams of Polyol C
50 grams of toluene diisocyanate (80/20 mixture of 2,4-/2,6-isomers)
1 cc. of lead octoate The mixture suddently solidified within about 10 seconds after catalyst addition and after about 3 minutes after catalyst addition, the casting cracked, split and swelled. It had a density of 0.39 gram/cc.

Example 15

Same procedure as in Example 3A employing the following components.

50 grams of Polyol A
94 grams of a prepolymer prepared from dipropylene glycol and toluene diisocyanate and having a percent free NCO of 25.7%
1 cc. of lead octoate The mixture suddenly solidified within about 25 seconds after catalyst addition and the casting was removed from the mold within about 40 seconds after catalyst addition. The solid rigid casting had a density of 1.16 grams/cc.

Example 16

Same procedure as in Example 3A employing the following components.

50 grams of Polyol A
75 grams of Prepolymer A
20 grams of dioctyl phthalate
1 cc. of a solution prepared by mixing 2 grams of a commercial lead octoate containing 24% lead and 196 grams of Varsol®, a product of Humble Oil and Refining Co.

The mixture suddenly solidified within about 3 minutes after catalyst addition and within about 4 minutes after catalyst addition the casting was removed from the mold. The rigid, translucent product had a density greater than 1 gram/cc.

We claim:
1. A rapid-setting, non-elastomeric, non-cellular polyurethane which is the reaction product of a composition comprising
    (1) an isocyanate-terminated reaction product of an organic diisocyanate with a polyhydroxyl-containing compound having from about 2 to about 8 hydroxyl groups and a hydroxyl equivalent weight of less than about 500, said reaction product having from about 20 to about 40 percent by weight of free NCO groups,
    (2) a polyhydroxyl-containing compound having from about 3 to about 8 hydroxyl groups and an OH equivalent weight of between about 75 and about 230,
    (3) optionally an ester of a carboxylic acid having a boiling point above about 150° C., and
    (4) a non-amine-containing catalyst for urethane formation;
wherein Components (1) and (2) are present in quantities so as to provide an NCO:OH ratio of from about 0.8:1 to about 1.5:1; Component 3 is present in quantities of from about 0 to about 50 percent by weight of the total weight of Components 1, 2 and 3, and Component 4 is present in quantities of from about 0.01 to about 5 percent by weight based upon the sum of weight of Components 1, 2 and 3.

2. The composition of claim 1 wherein Component (1) has from about 24 to about 36% free NCO groups, Component (3) is present in quantities of from about 5 to about 40 percent by weight of the sum of Components (1), (2) and (3) and Component (4) is present in quantities of from about 0.1 to about 2 percent by weight of the sum of Components (1), (2) and (3).

3. The composition of claim 2 wherein Component (1) is the reaction product of toluene diisocyanate or xylylene diisocyanate with the reaction product of propylene oxide or ethylene oxide with glycerine or sucrose.

4. The composition of claim 3 wherein Component (4) is an organo-metal compound of lead or tin.

References Cited

UNITED STATES PATENTS

| | | | |
|---|---|---|---|
| 3,464,935 | 9/1969 | Sepkoski et al. | 260—77.5 AP |
| 3,635,904 | 1/1972 | Briggs et al. | 260—77.5 AP |
| 3,632,533 | 1/1972 | Winkler | 260—31.8 N |

DONALD E. CZAJA, Primary Examiner

M. J. WELSH, Assistant Examiner

U.S. Cl. X.R.

260—9 R, 31.2 N, 32.2, 37 N, 77.5 AP, 77.5 AB

UNITED STATES PATENT OFFICE
CERTIFICATE OF CORRECTION

Patent No. 3,726,827     Dated April 10, 1973

Inventor(s) Elvis E. Jones, Franciszek Olstowski and Donald B. Parrish

It is certified that error appears in the above-identified patent and that said Letters Patent are hereby corrected as shown below:

Col. 1, line 54, change "an" to --a--.

Col. 2, line 49, change "acetyl" to --octyl--.

Signed and sealed this 19th day of November 1974.

(SEAL)
Attest:

McCOY M. GIBSON JR.
Attesting Officer

C. MARSHALL DANN
Commissioner of Patents